United States Patent
Pasternak (10) Patent No.: US 9,793,959 B2
(45) Date of Patent: Oct. 17, 2017

(54) REGISTRATION SYSTEM, APPARATUS, ARCHITECTURE, AND METHOD FOR INDUCTIVE ENERGY COMMUNICATION SYSTEMS

(71) Applicant: Advanced Wireless Innovations LLC, Santa Monica, CA (US)

(72) Inventor: Shawn Pasternak, Longbeach, CA (US)

(73) Assignee: Advanced Wireless Innovations LLC, Santa Monica, CA (US)

( * ) Notice: Subject to any disclaimer, the term of this patent is extended or adjusted under 35 U.S.C. 154(b) by 201 days.

(21) Appl. No.: 14/804,301

(22) Filed: Jul. 20, 2015

(65) Prior Publication Data

US 2016/0028444 A1  Jan. 28, 2016

Related U.S. Application Data

(60) Provisional application No. 62/027,728, filed on Jul. 22, 2014.

(51) Int. Cl.
| | |
|---|---|
| *H01F 38/14* | (2006.01) |
| *H02J 5/00* | (2016.01) |
| *H02J 7/02* | (2016.01) |
| *H04B 5/00* | (2006.01) |
| *H02J 7/00* | (2006.01) |
| *H02J 50/90* | (2016.01) |
| *H02J 50/10* | (2016.01) |

(52) U.S. Cl.
CPC ............ *H04B 5/0037* (2013.01); *H01F 38/14* (2013.01); *H02J 7/0044* (2013.01); *H02J 7/025* (2013.01); *H02J 50/90* (2016.02); *H04B 5/0081* (2013.01); *H02J 5/005* (2013.01); *H02J 7/0042* (2013.01); *H02J 50/10* (2016.02)

(58) Field of Classification Search
CPC ......... H01F 38/14; H02J 5/005; H02J 7/0042; H02J 7/0044; H02J 7/025; H02J 17/00; H02J 50/05; H02J 50/10; H02J 50/12; H02J 50/90; H04B 5/0012; H04B 5/0037; H04B 5/0075; H04B 5/0093
USPC .......................................... 307/104
See application file for complete search history.

(56) References Cited

U.S. PATENT DOCUMENTS

| | | | |
|---|---|---|---|
| 9,136,734 B2* | 9/2015 | Azancot ................. | H01F 38/14 |
| 9,318,915 B2* | 4/2016 | Miller .................... | H02J 7/025 |
| 2008/0111518 A1* | 5/2008 | Toya ....................... | H02J 7/025 |
| | | | 320/108 |
| 2008/0296979 A1* | 12/2008 | Kato ...................... | H02J 7/0044 |
| | | | 307/104 |
| 2012/0268103 A1* | 10/2012 | Henson ................. | G06F 1/1626 |
| | | | 324/76.11 |

* cited by examiner

*Primary Examiner* — Levi Gannon
(74) *Attorney, Agent, or Firm* — Mintz Levin Cohn Ferris Glovsky and Popeo, P.C.

(57) ABSTRACT

Registration system, apparatus, architecture, and method for to repeatably operatively align or register a second inductive energy communication device or apparatus on or near a first inductive energy communication device or apparatus. Other embodiments may be described and claimed.

20 Claims, 8 Drawing Sheets

FIGURE 4A Left side
FIGURE 4B Top view
FIGURE 4C front view
FIGURE 4D rear view

FIGURE 5A Left side
FIGURE 5B Top view
FIGURE 5C front view
FIGURE 5D rear view

FIGURE 6A
Left side

FIGURE 6B
Top view

FIGURE 6C
front view

FIGURE 6D
rear view

REGISTRATION SYSTEM, APPARATUS, ARCHITECTURE, AND METHOD FOR INDUCTIVE ENERGY COMMUNICATION SYSTEMS

CROSS REFERENCE TO RELATED APPLICATIONS

The present invention is related to U.S. Provisional Patent application 62/027,728 entitled "REGISTRATION SYSTEM, APPARATUS, ARCHITECTURE, AND METHOD FOR INDUCTIVE ENERGY COMMUNICATION SYSTEMS", and filed Jul. 22, 2014, which is incorporated by reference.

TECHNICAL FIELD

Various embodiments described herein relate to inductive energy communication systems, apparatus, and architecture, in particular registration apparatus, system, architecture, and methods for inductive energy communication devices and apparatus.

BACKGROUND INFORMATION

It may be desirable to repeatably align or register a first inductive energy communication device or apparatus relative to a second inductive energy communication device or apparatus. The present invention includes such a registration apparatus, system, architecture, and method.

DETAILED DESCRIPTION

Figure 1A:
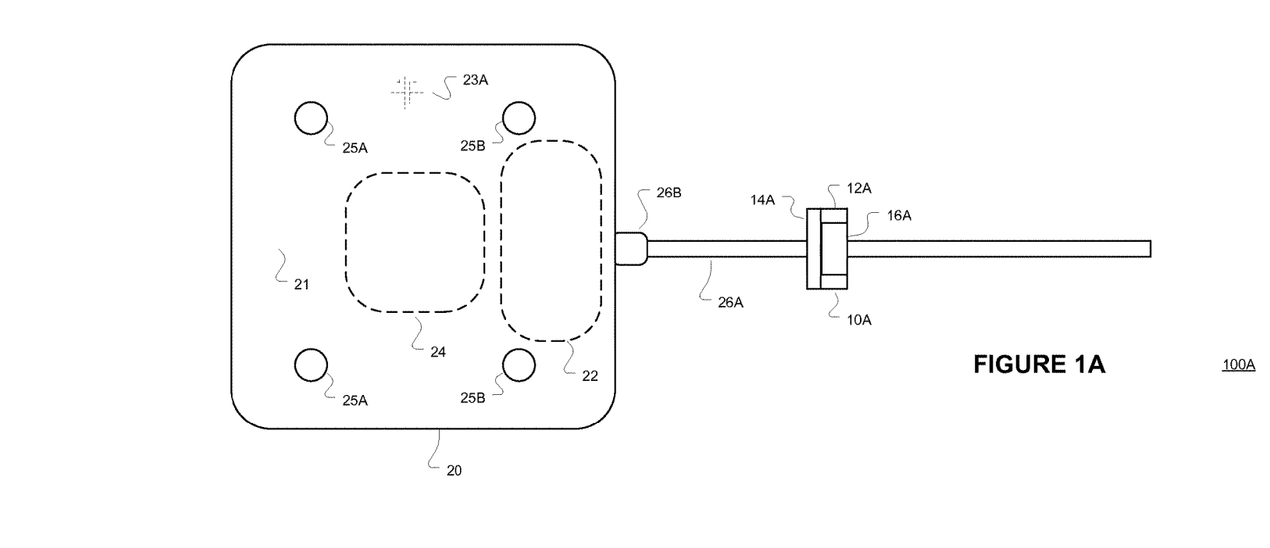
FIG. 1A is a simplified top view of inductive energy communication (IEC) registration architecture including a first IEC apparatus according to various embodiments.
Figure 1B:
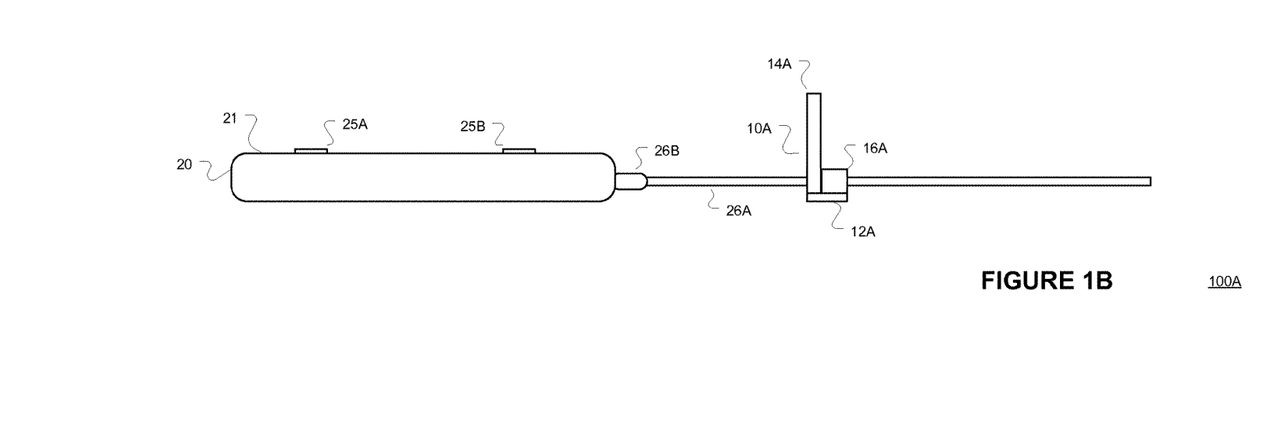
FIG. 1B is a simplified side view of IEC registration architecture including a first IEC apparatus according to various embodiments.

FIG. 1A is a simplified top view of inductive energy communication (IEC) registration architecture 100A including a first IEC apparatus 20 and a registration apparatus 10A according to various embodiments. FIG. 1B is a simplified side view of IEC registration architecture 100A including a first IEC apparatus 20 and a registration apparatus 10A according to various embodiments. In an embodiment, the first IEC apparatus 20 may include an induction coil 24, electronic circuitry or processor 22, a rechargeable battery 23A, one or more feet or extensions 25A-25D, and a power cord 26A. The power cord may have a connector 26B that may be removabley connected to the electronic circuitry or processor 22. The power cord 26A may be connectable to a power source including an alternating current or direct current power source.

The electronic circuitry or processor 22 may generate an electromagnetic field via the induction coil and external energy provided by the power cord 26A. The electronic circuitry or processor 22 may also generate an electromagnetic field via the induction coil and the rechargeable battery 23A. The electronic circuitry or processor 22 may generate a high frequency electromagnetic field. In a further embodiment, the electronic circuitry or processor 22 may charge the battery 23A via energy provided by the power cord 26A. In a further embodiment, the electronic circuitry or processor 22 may charge the battery 23A via energy received from the induction coil 24.

Figure 2A:
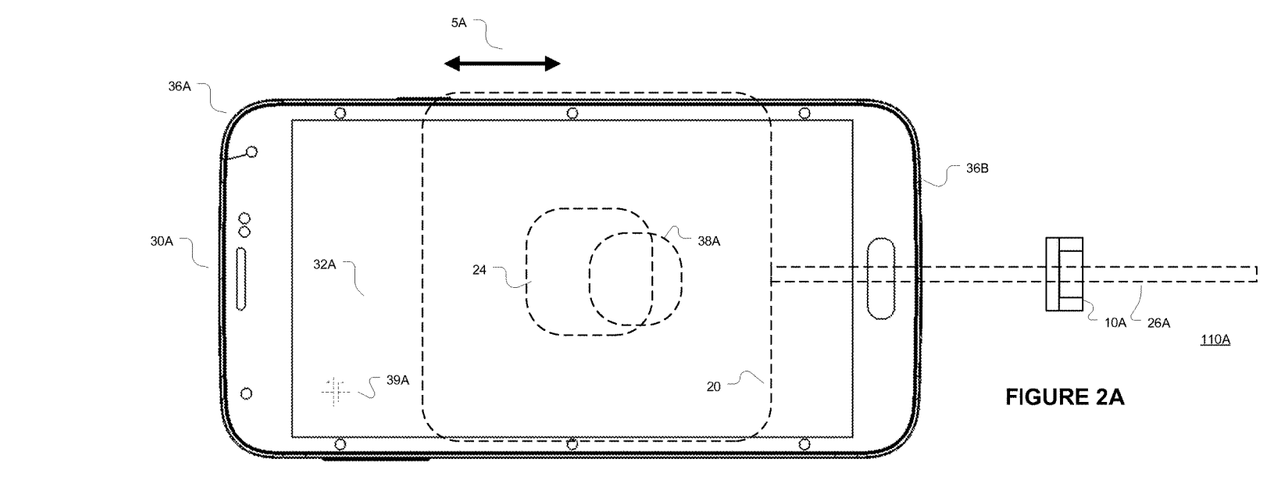
FIG. 2A is a simplified top view of inductive energy communication (IEC) registration architecture including a second IEC apparatus being operatively placed on or near a first IEC apparatus according to various embodiments.

FIG. 2A is a simplified top view of inductive energy communication (IEC) registration architecture 110A including a second IEC apparatus 30A being operatively placed on or near a first IEC apparatus 20 according to various embodiments. As shown in FIG. 2A, the second IEC apparatus 30A may include an upper surface or face 32A, a back surface 34A, a perimeter 36A, a bottom section 36B, and an induction coil 38A. In an embodiment, it may be desirable to substantially co-align the first IEC apparatus 20 induction coil 24 with the second apparatus 30A induction 38A to effectively form/operate a transformer between the coils 24, 38A. In an embodiment, one of the coil 24 and 38A may be the primary coil and the other of the coil 38A and 24 may be the secondary coil. In an embodiment, energy may be communicated between the apparatus 20, 30A via the coils 24 and 38A.

In an embodiment, the second IEC apparatus 38A may receive energy from the first IEC apparatus 20 when their coils 24 and 38A are about operatively placed near each other to allow energy to be transferred from the coil 24 to the coil 38A. The second IEC apparatus 30A may use the energy received by its coil 38A to enable apparatus components (face or screen 32A) to function or charge an internal battery 39A. In a further embodiment, the second IEC apparatus 38A may transfer or provide energy to the first IEC apparatus 20 when their coils 24 and 38A are about operatively placed near each other to allow energy to be transferred from the coil 38A to the coil 24. The first IEC apparatus 24 may use the energy received by its coil 24 to enable apparatus components (electronic circuitry or process 22) to function or charge an internal battery 23A.

Figure 2B:
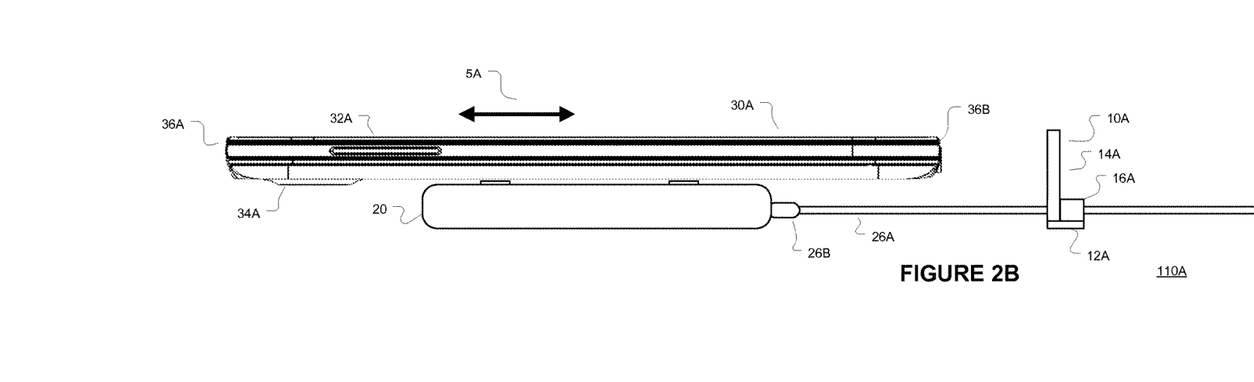
FIG. 2B is a simplified side view of inductive energy communication (IEC) registration architecture including a second IEC apparatus being operatively placed on or near a first IEC apparatus according to various embodiments.

FIG. 2A is a simplified top view and FIG. 2B is a simplified bottom view of inductive energy communication (IEC) registration architecture 110A including a second IEC apparatus 30A being operatively placed or aligned on or near a first IEC 20 apparatus according to various embodiments. In either operational mode, insufficient or no energy may be communicated between coils 24 and 38A when the coils 24, 38A are not within a minimum distance or axial alignment. A user may place the second IEC apparatus 30A on the first IEC apparatus 20 as shown in FIG. 2A and attempt to shift the apparatus 30A over the apparatus 20 so their respective coils 38A, 24 are operatively aligned. The second IEC apparatus 30A or first IEC apparatus 20 may provide a visual (screen 32A) or audio confirmation that the coils 24, 38A are operatively aligned so energy may be communicated between the apparatuses 20, 30A via the coils 24, 38A.

It may be difficult depending on environmental conditions and apparatus's condition (dead battery 23A, 31A) to operatively align or re-align their coils 24, 38A. In an embodiment, the first IEC apparatus 20 may primarily be an energy providing apparatus and configured to provide energy to second apparatus 30A having different dimensions. The second IEC apparatus 30A may be primarily an energy receiving apparatus 30A including a portable electronic device including a laptop, cellular phone, tablet, gaming controller, headset, or other device. As shown in FIG. 2A, the second IEC apparatus 30A may be larger than the first IEC apparatus making visual alignment difficult.

In order to enable users to easily and repeatably align a second IEC apparatus 30A with a first IEC apparatus 20, architecture 110A may include a registration apparatus 10A as shown in FIGS. 2A and 2B. In an embodiment, a user may employ the algorithm 40 shown in FIG. 7A to initially align the apparatuses 20, 30A and set the registration apparatus 10A for future apparatus 20, 30A operative re-alignment. As shown in FIGS. 2A and 2B, a user may first place a first or second IEC apparatus 20, 30A near or on the second or first apparatus 30A, 20 (activity 42 of algorithm 40). A user may then move one or both apparatuses 20, 30A away and toward the registration apparatus 10A (along vector 5A) until the coils 24, 38A are operatively aligned (activities 44 and 46 of algorithm 40).

Figure 2C:
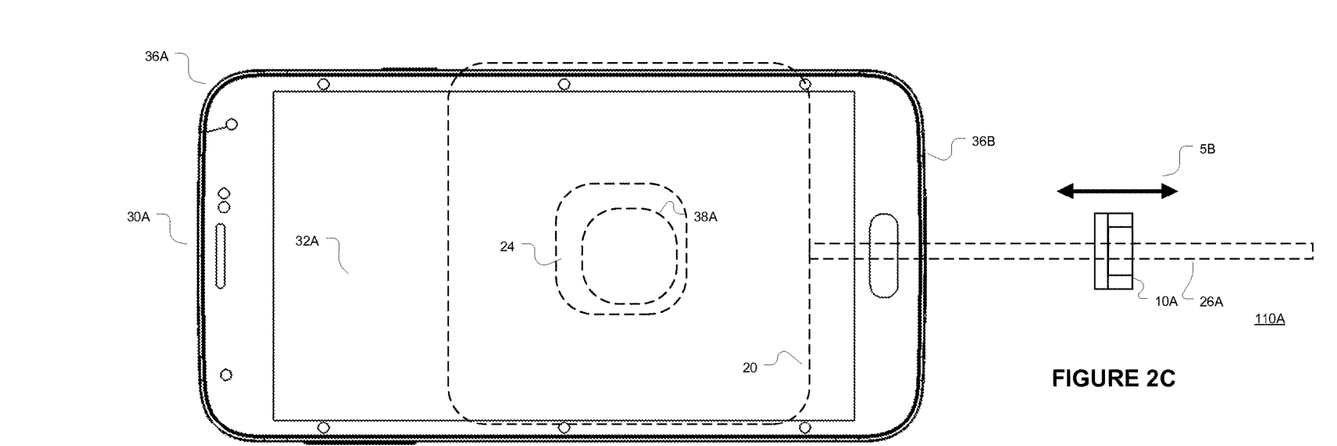
FIG. 2C is a simplified top view of inductive energy communication (IEC) registration architecture including a registration apparatus being adjusted after operative placement of a second IEC apparatus on or near a first IEC apparatus according to various embodiments.
Figure 2D:
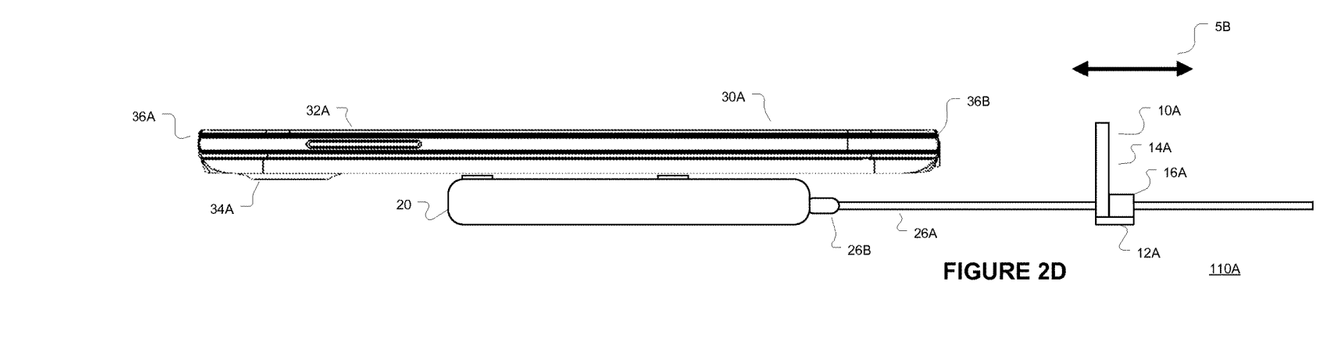
FIG. 2D is a simplified side view of inductive energy communication (IEC) registration architecture including a registration apparatus being adjusted after operative placement of a second IEC apparatus on or near a first IEC apparatus according to various embodiments.
Figure 7A:
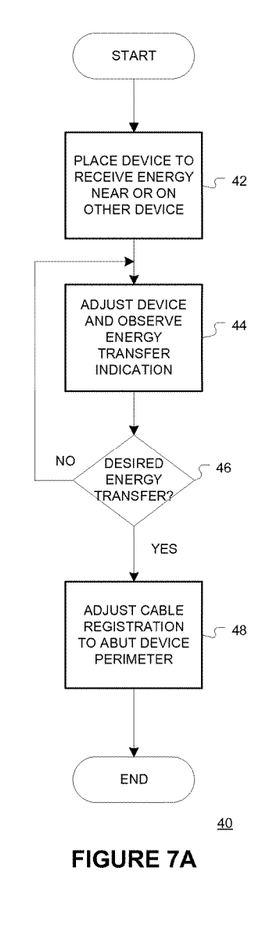
FIG. 7A is flow diagram of an algorithm for adjusting a registration apparatus based on operative placement of a second IEC apparatus on or near a first IEC apparatus according to various embodiments.

Once the coils 24, 38A are operatively aligned, the registration apparatus 10A may be shifted to be adjacent the perimeter 36A of the second IEC apparatus 30A (activity 48 of algorithm 40) via movement vector 5B. In an embodiment, the registration apparatus 10A may be releasably or fictionably moveable or slidable on the power cable 26A of the first IEC apparatus 20 as shown in FIGS. 2C and 2D. FIG. 2C is a simplified top view of inductive energy communication (IEC) registration architecture 110A including a registration apparatus 10A being adjusted after operative placement of a second IEC apparatus 30A on or near a first IEC apparatus 20 according to various embodiments. FIG. 2D is a simplified side view of inductive energy communication (IEC) registration architecture 110A including a registration apparatus 10A being adjusted after operative placement of a second IEC apparatus 30A on or near a first IEC apparatus 20 according to various embodiments.

Figure 2E:
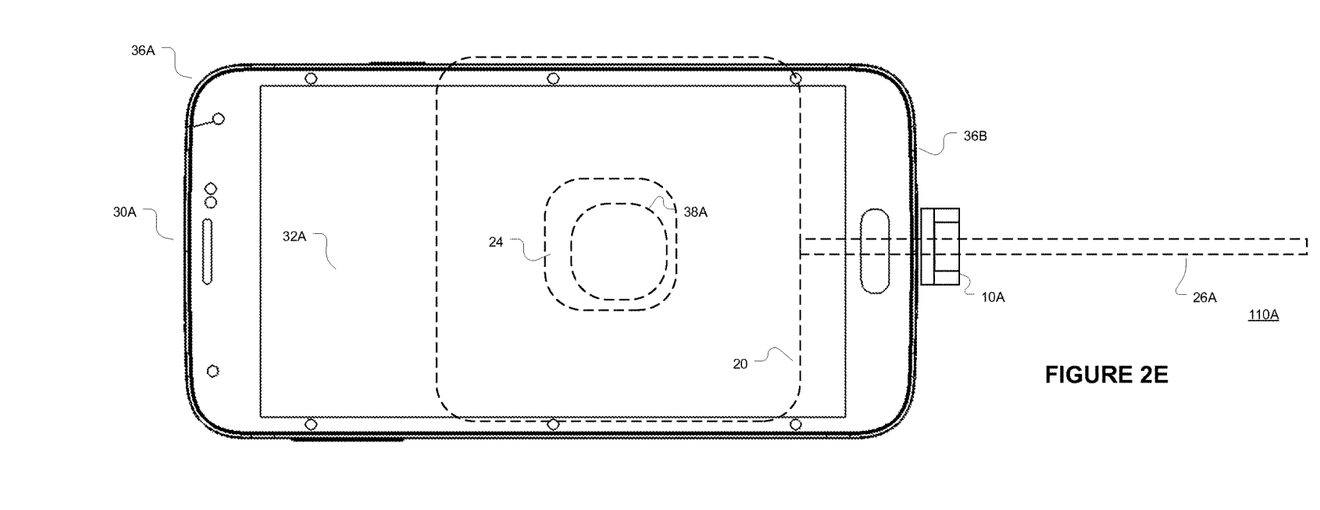
FIG. 2E is a simplified top view of inductive energy communication (IEC) registration architecture including a registration apparatus adjusted based on operative placement of a second IEC apparatus on or near a first IEC apparatus according to various embodiments.
Figure 2F:
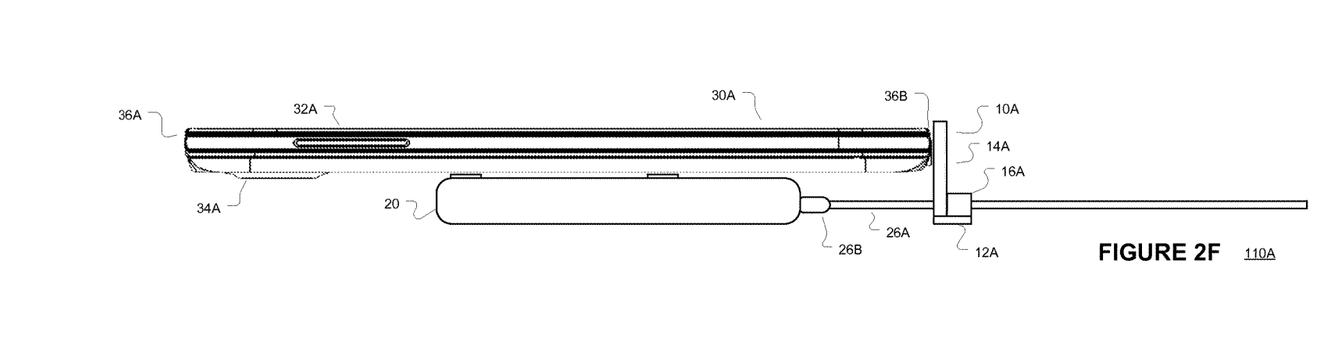
FIG. 2F is a simplified side view of inductive energy communication (IEC) registration architecture including a registration apparatus adjusted based on operative placement of a second IEC apparatus on or near a first IEC apparatus according to various embodiments.

FIG. 2E is a simplified top view and FIG. 2F is a simplified side view of inductive energy communication (IEC) registration architecture 110A including a registration apparatus 10A adjusted after operative placement of a second IEC apparatus 30A on or near a first IEC apparatus 20 according to various embodiments. As shown in FIGS. 2E and 2F, the registration apparatus 10A is adjacent to the second IEC apparatus bottom section 36B and the coils 24, 38A are operatively co-aligned. The registration apparatus 10A may be held in place by fiction between the apparatus 10A and the power cord 26A in an embodiment.

Figure 3A:
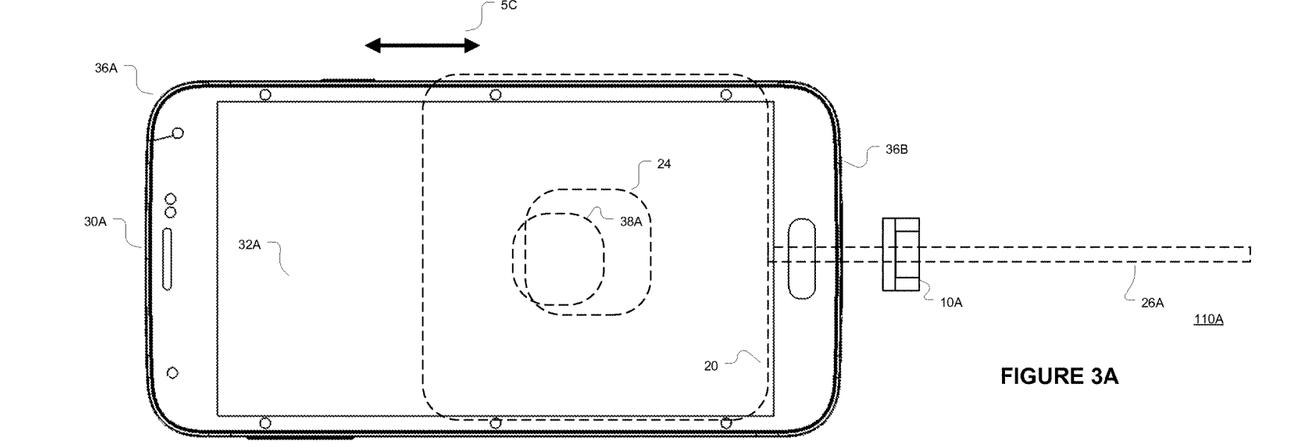
FIG. 3A is a simplified top view of inductive energy communication (IEC) registration architecture including advancing a second IEC apparatus on or near a first IEC apparatus via a registration apparatus according to various embodiments.
Figure 3B:
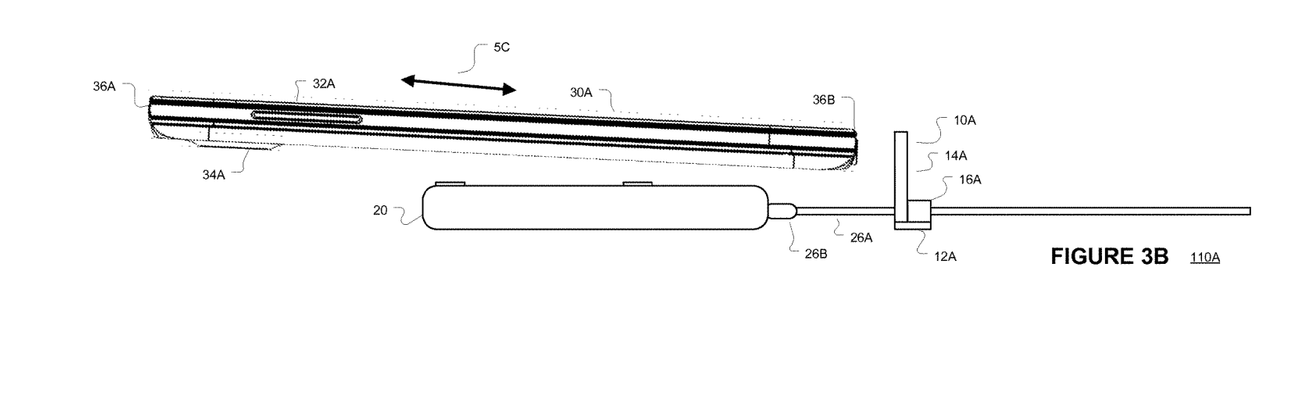
FIG. 3B is a simplified side view of inductive energy communication (IEC) registration architecture including advancing a second IEC apparatus on or near a first IEC apparatus via a registration apparatus according to various embodiments.
Figure 3C:
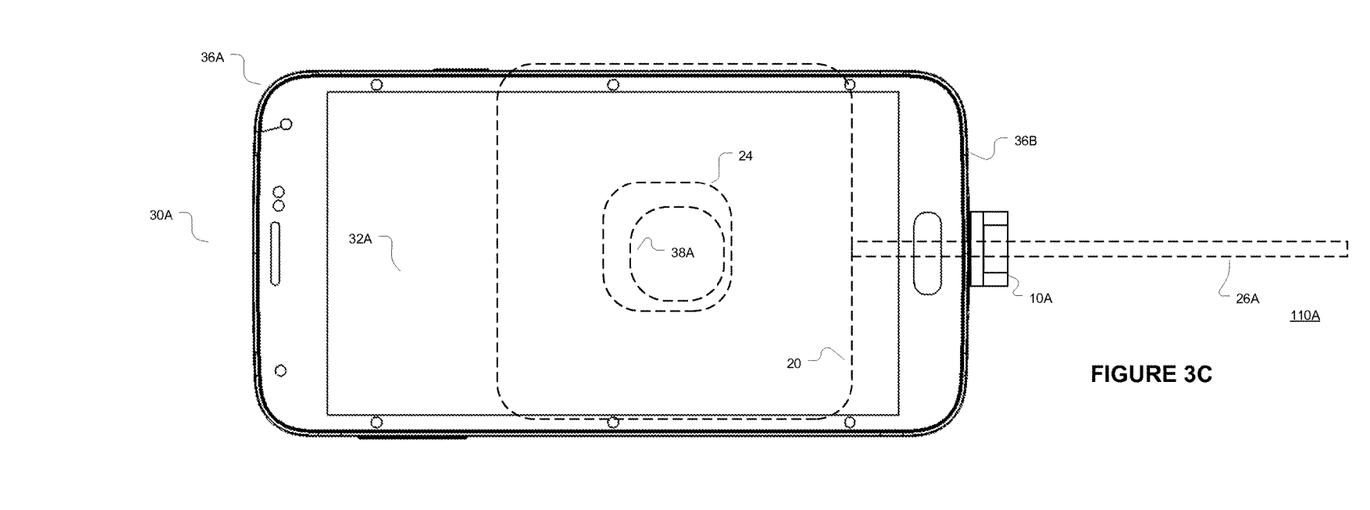
FIG. 3C is a simplified top view of inductive energy communication (IEC) registration architecture including a second IEC apparatus operatively advanced on or near a first IEC apparatus via a registration apparatus according to various embodiments.
Figure 3D:
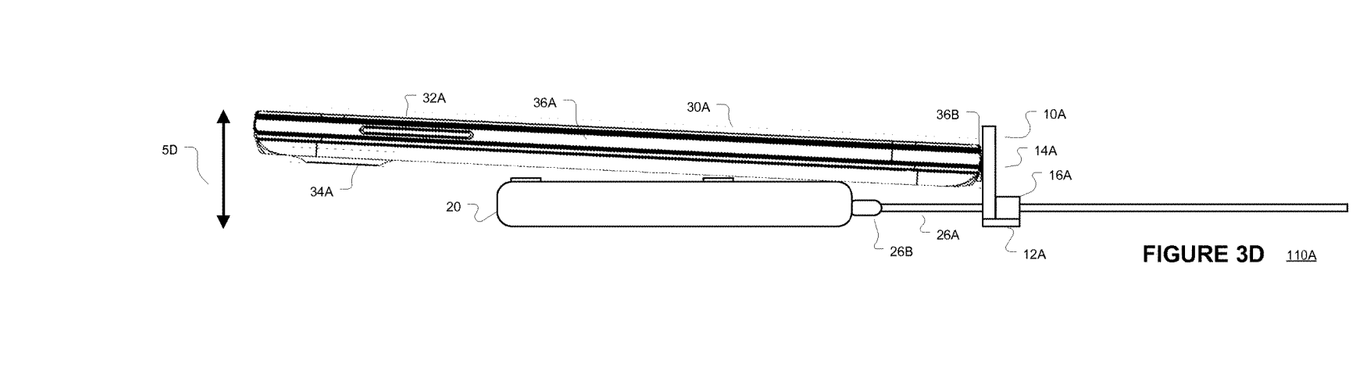
FIG. 3D is a simplified side view of inductive energy communication (IEC) registration architecture including a second IEC apparatus operatively advanced on or near a first IEC apparatus via a registration apparatus according to various embodiments.
Figure 7B:
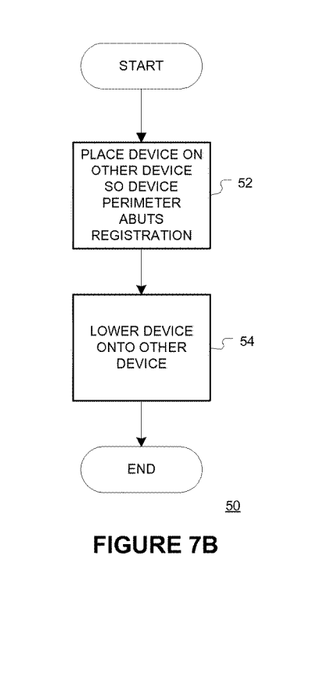
FIG. 7B is flow diagram of an algorithm for operatively advancing a second IEC apparatus on or near a first IEC apparatus via a registration apparatus according to various embodiments.

Once the registration apparatus 10A has been adjusted via algorithm 40, a user may employ the algorithm 50 shown in FIG. 7B to operatively re-align the second IEC apparatus 30A with the first IEC apparatus 20. FIGS. 3A and 3C are simplified top views and FIGS. 3B and 3D are simplified side views of inductive energy communication (IEC) registration architecture 110A employing the registration apparatus 10A to operatively re-align a second IEC apparatus 30A on or near a first IEC apparatus 20 according to various embodiments. As shown in FIGS. 3A and 3B in an embodiment, a registration apparatus 10A may include a base 12A, an extension 14A and a cable interface 16A. In an embodiment, a user may move a second IEC apparatus 30A toward the registration apparatus 10A (movement vector 5C) extension 14A until an apparatus 30A section (based 36A in an embodiment) abuts, contacts, or is adjacent the registration apparatus 10A registration extension 14A (activity 52 of algorithm 50). A user may then rotate the second IEC downward (movement vector 5D as shown in FIGS. 3D) until the second IEC apparatus 30A rests on one or more feet or extensions 25A-D of the first IEC apparatus 20 while also abutting the registration apparatus 10A (activity 54 of algorithm 50).

Figure 4A:
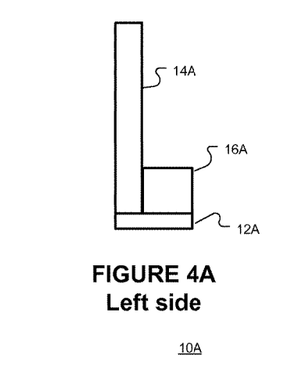
FIG. 4A is a simplified left side view of an IEC architecture registration apparatus according to various embodiments.
Figure 4B:
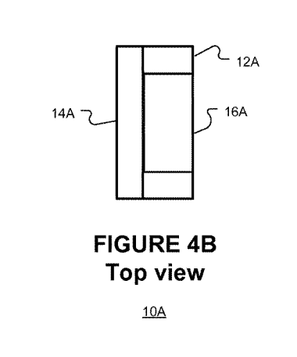
FIG. 4B is a simplified top view of an IEC architecture registration apparatus according to various embodiments.
Figure 4C:
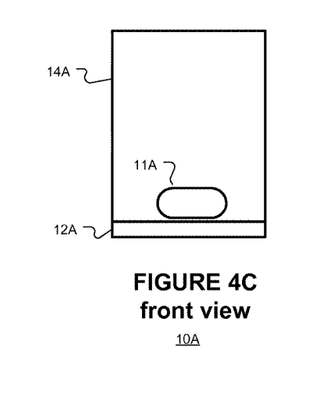
FIG. 4C is a simplified front view of an IEC architecture registration apparatus according to various embodiments.
Figure 4D:
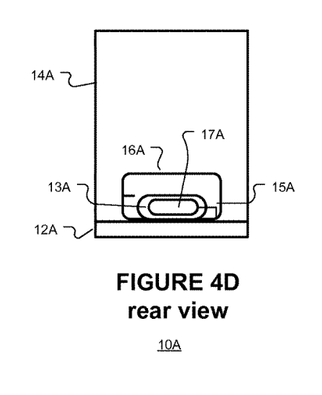
FIG. 4D is a simplified rear view of an IEC architecture registration apparatus according to various embodiments.

FIG. 4A is a simplified left side view, FIG. 4B is a simplified top view, FIG. 4C is a simplified front view, and FIG. 4D is a simplified rear view of an IEC architecture registration apparatus 10A according to various embodiments. As shown in FIGS. 4A-4D, the registration apparatus 10A includes a base 12A, an extension 14A, and a cable interface 16A. The base 12A and extension 14A may have a similar width. The base 12A may be configured to rest on a flat surface and hold the extension in about 90 degrees from the flat surface. The extension 14A height may vary as a function of the first IEC apparatus 20 height from on a flat surface (including the feet or extensions 25A-25D) in an embodiment and the thickness (from back 34A to front 32A) of the second IEC apparatus 30A.

As shown in FIG. 4D, the cable interface 16A may include a compressible material 13A, a fenestration 17A smaller than the cable 26A diameter and a releasably closable latch 15A. The extension 14A may have a fenestration 11A slightly larger than the cable 26A diameter and the cable 26B base. When the cable interface 16A is open via the latch 15A, the cable 26B base may be insertable through the cable interface 16A and extension fenestration 11A. A user may leave the latch 15A open in order to move the registration apparatus 10A along the cable 26A during registration placement (activities 42-46 of algorithm 40) and then close the latch 15A to securely engage the cable 26A. In another embodiment, a user may be able to overcome the fiction between the cable interface 16A and cable 26A with the latch 15A closed during registration placement. The compressible material 13A may be a polymer, silicon, natural material including rubber or other compressible material. In another embodiment, the cable interface 16A may not include a compressible material 13A.

Figure 5A:
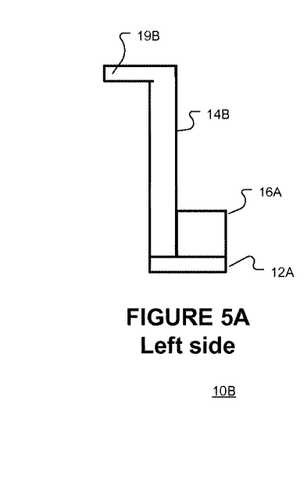
FIG. 5A is a simplified left side view of another IEC architecture registration apparatus according to various embodiments.
Figure 5B:
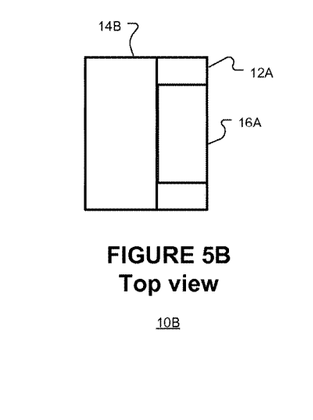
FIG. 5B is a simplified top view of another IEC architecture registration apparatus according to various embodiments.
Figure 5C:
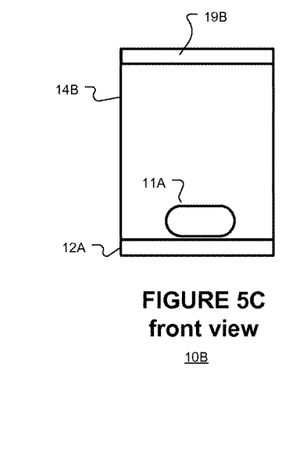
FIG. 5C is a simplified front view of another IEC architecture registration apparatus according to various embodiments.
Figure 5D:
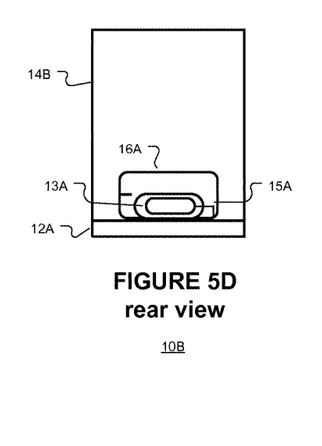
FIG. 5D is a simplified rear view of another IEC architecture registration apparatus according to various embodiments.

FIG. 5A is a simplified left side view, FIG. 5B is a simplified top view, FIG. 5C is a simplified front view, and FIG. 5D is a simplified rear view of an IEC architecture registration apparatus 10B according to various embodiments. As shown in FIGS. 5A-5D, the registration apparatus 10B includes a base 12A, an extension 14B, and a cable interface 16A. The base 12A and extension 14B may have a similar width. In an embodiment, the extension 14B may include a horizontal extension 19B at its distal end. The extension 19B length and thickness may more easily enable a user to engage a section of a second IEC apparatus 30A (bottom edge 36A in an embodiment) when a user is attempting to operatively re-align the second IEC apparatus 30A with the first IEC apparatus 20 via the registration extension 14B.

Figure 6A:
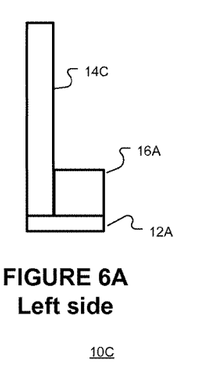
FIG. 6A is a simplified left side view of a further IEC architecture registration apparatus according to various embodiments.
Figure 6B:
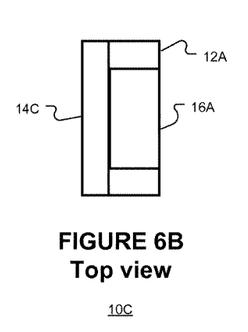
FIG. 6B is a simplified top view of a further IEC architecture registration apparatus according to various embodiments.
Figure 6C:
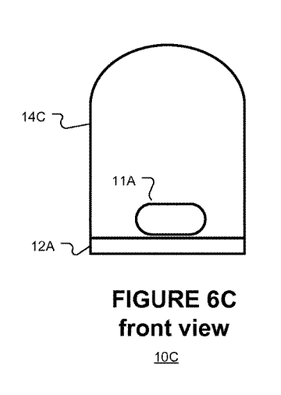
FIG. 6C is a simplified front view of a further IEC architecture registration apparatus according to various embodiments.
Figure 6D:
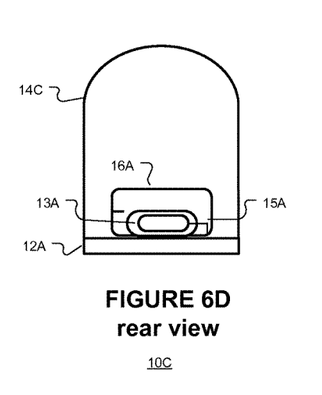
FIG. 6D is a simplified rear view of a further IEC architecture registration apparatus according to various embodiments.

FIG. 6A is a simplified left side view, FIG. 6B is a simplified top view, FIG. 6C is a simplified front view, and FIG. 6D is a simplified rear view of an IEC architecture registration apparatus 10C according to various embodiments. As shown in FIGS. 6A-6D, the registration apparatus 10C includes a base 12A, an extension 14C, and a cable interface 16A. The extension 14C may be similar to extension 14A and 14B but have a different shape. Other registration shapes and configurations are possible within the scope of the invention as recited herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An electronic device registration apparatus for repeatably positioning an electronic device first surface on an electric device surface, the electronic device including a second surface offset from its first surface and the electric device having an electric cord extending substantially planar to its surface, the registration apparatus including:
   a base;
   a fenestration extending through the base and sized to enable the electric cord to one of releasably and frictionally slide through the fenestration; and
   an extension above the base and fenestration, the extension having a surface configured to abut the electronic device second surface.

2. The electronic device registration apparatus of claim 1, wherein the electric cord has a substantially uniform envelope along a section and the base fenestration is smaller than the electric cord uniform envelope but enables apparatus movement with overcomable fiction along the cord's substantially uniform envelope section.

3. The electronic device registration apparatus of claim 1, wherein the electric cord has a substantially uniform envelope along a section and the base fenestration is formed from a releasable mechanism, the fenestration smaller than the electric cord uniform envelope when not released and larger than electric cord uniform envelope when released.

4. The electronic device registration apparatus of claim 1, wherein the electronic device second surface is substantially planar and the registration apparatus extension is substantially planar.

5. The electronic device registration apparatus of claim 1, wherein the electronic device first surface is substantially planar and the electric device surface is substantially planar.

6. The electronic device registration apparatus of claim 1, wherein the electronic device first surface is substantially planar, the electric device surface is substantially planar, and the electronic device substantially planar first surface is larger than the electric device substantially planar surface.

7. The electronic device registration apparatus of claim 5, wherein the electronic device includes an induction coil substantially parallel and adjacent to substantially planar first surface, the electric device includes an induction coil substantially parallel and adjacent to its substantially planar surface, and the electric device communicates energy with the electronic device when their respective coils are operatively collocated.

8. The electronic device registration apparatus of claim 5, wherein the electronic device includes an induction coil substantially parallel and adjacent to substantially planar first surface, the electric device includes an induction coil substantially parallel and adjacent to its substantially planar surface, and the electric device is configured to provide energy to the electronic device when their respective coils are operatively collocated.

9. An electronic device registration system for an electronic device having a first surface and a second surface offset from its first surface, the system including:
   an electric device having a surface and an electric cord extending substantially planar to its surface, the electronic device first surface to be repeatably positioned on the electric device surface; and
   a registration apparatus including:
      a base;
      a fenestration extending through the base and sized to enable the electric cord to one of releasably and frictionally slide through the fenestration; and
      an extension above the base and fenestration, the extension having a surface configured to abut the electronic device second surface.

10. The electronic device registration system of claim 9, wherein the electric cord has a substantially uniform envelope along a section and the base fenestration is smaller than the electric cord uniform envelope but enables apparatus movement with overcomable fiction along the cord's substantially uniform envelope section.

11. The electronic device registration system of claim 9, wherein the electric cord has a substantially uniform envelope along a section and the base fenestration is formed from a releasable mechanism, the fenestration smaller than the electric cord uniform envelope when not released and larger than electric cord uniform envelope when released.

12. The electronic device registration system of claim 9, wherein the electronic device second surface is substantially planar and the registration apparatus extension is substantially planar.

13. The electronic device registration system of claim 9, wherein the electronic device first surface is substantially planar and the electric device surface is substantially planar.

14. The electronic device registration system of claim 9, wherein the electronic device first surface is substantially planar, the electric device surface is substantially planar, and the electronic device substantially planar first surface is larger than the electric device substantially planar surface.

15. The electronic device registration system of claim 13, wherein the electronic device includes an induction coil substantially parallel and adjacent to substantially planar first surface, the electric device includes an induction coil substantially parallel and adjacent to its substantially planar surface, and the electric device is configured to provide energy to the electronic device when their respective coils are operatively collocated.

16. A method of employing an electronic device registration apparatus to repeatably position an electronic device first surface on an electric device surface, the electronic device including a second surface offset from its first surface, the electric device having an electric cord extending substantially planar to its surface, including:
   positioning the electronic device first surface at a desired location on the electric device surface; and
   slidably abutting an extension of the electronic device registration apparatus to the electronic device second surface, the electronic device registration apparatus including a base, a fenestration extending through the base and sized to enable the electric cord to one of releasably and frictionally slide through the fenestration, and the extension above the base and fenestration, the extension having a surface configured to abut the electronic device second surface.

17. The method of employing an electronic device registration apparatus of claim 16, wherein the electric cord has a substantially uniform envelope along a section and the base fenestration is formed from a releasable mechanism, the fenestration smaller than the electric cord uniform envelope when not released and larger than electric cord uniform envelope when released.

18. The method of employing an electronic device registration apparatus of claim 16, wherein the electronic device first surface is substantially planar, the electric device surface is substantially planar, and the electronic device substantially planar first surface is larger than the electric device substantially planar surface.

19. The method of employing an electronic device registration apparatus of claim 18, wherein the electronic device includes an induction coil substantially parallel and adjacent to substantially planar first surface, the electric device includes an induction coil substantially parallel and adjacent to its substantially planar surface, and the method includes positioning the electronic device first surface at a desired location on the electric device surface to operatively collocate respective coils to enable energy communication between the coils.

20. The method of employing an electronic device registration apparatus of claim 18, wherein the electronic device includes an induction coil substantially parallel and adjacent to substantially planar first surface, the electric device includes an induction coil substantially parallel and adjacent to its substantially planar surface, and the method includes positioning the electronic device first surface at a desired location on the electric device surface to operatively collocate respective coils to enable energy transfer from the electric device coil to the electronic device coil.

\* \* \* \* \*